United States Patent [19]

Sandefur

[11] 3,946,861

[45] Mar. 30, 1976

[54] CONVEYOR ASSEMBLY

[76] Inventor: Douglas M. Sandefur, 14507 S. Hawthorne Blvd., Lawndale, Calif. 90260

[22] Filed: Dec. 16, 1974

[21] Appl. No.: 533,076

[52] U.S. Cl. .............................................. 198/208
[51] Int. Cl.² .......................................... B65G 15/30
[58] Field of Search ............ 198/208, 202, 203, 204; 74/242.11 A, 242.11 R

[56] References Cited
UNITED STATES PATENTS

| | | | |
|---|---|---|---|
| 1,595,597 | 8/1926 | Brandwood et al. | 198/208 X |
| 2,649,188 | 8/1953 | Duncan | 198/203 |
| 2,920,751 | 11/1960 | Krupp et al. | 198/208 |
| 2,954,114 | 9/1960 | Slomer | 198/208 |
| 3,101,145 | 8/1963 | Koski et al. | 198/203 |
| 3,828,916 | 8/1974 | Patz | 198/204 X |

Primary Examiner—Robert B. Reeves
Assistant Examiner—John P. Shannon
Attorney, Agent, or Firm—Poms, Smith, Lande & Glenny Professional Corporation

[57] ABSTRACT

A conveyor assembly having a spring loaded belt tension roller mounted in slots on the sides of the frame to provide automatic adjustment of an endless belt to maintain optimum tautness. The frame has a relatively low profile with the belt guided by the vertical side rails of the frame in the forward and reverse directions to prevent lateral shifting of the belt, with the side rails connected by coupling bars. The drive roller is mounted on a single roller bearing with the inner race secured to a bolt which is fitted to a keyed hole on the side of the frame with the other end of the drive roller directly coupled to a drive motor. An idler roller mounted in close proximity to the drive roller provides contact of the belt with a substantial portion of the circumference of the drive roller to increase the frictional drive between the drive roller and the conveyor belt. A slide surface on the top of the frame is removable to provide access to the tension roller, drive roller, and idler roller for purposes of threading the tension roller and ease of maintenance of all the rollers.

13 Claims, 8 Drawing Figures

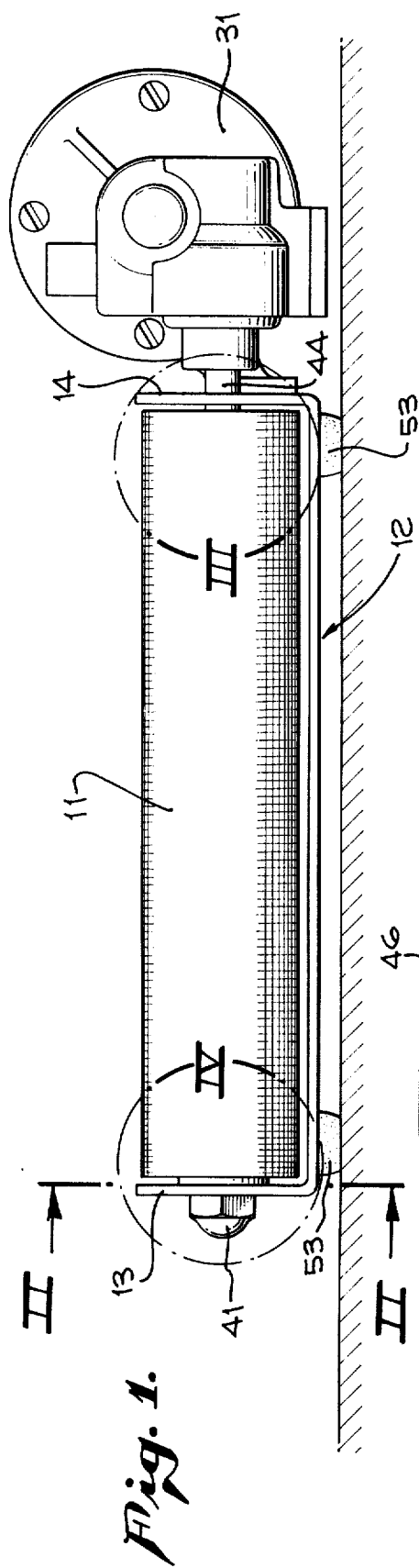
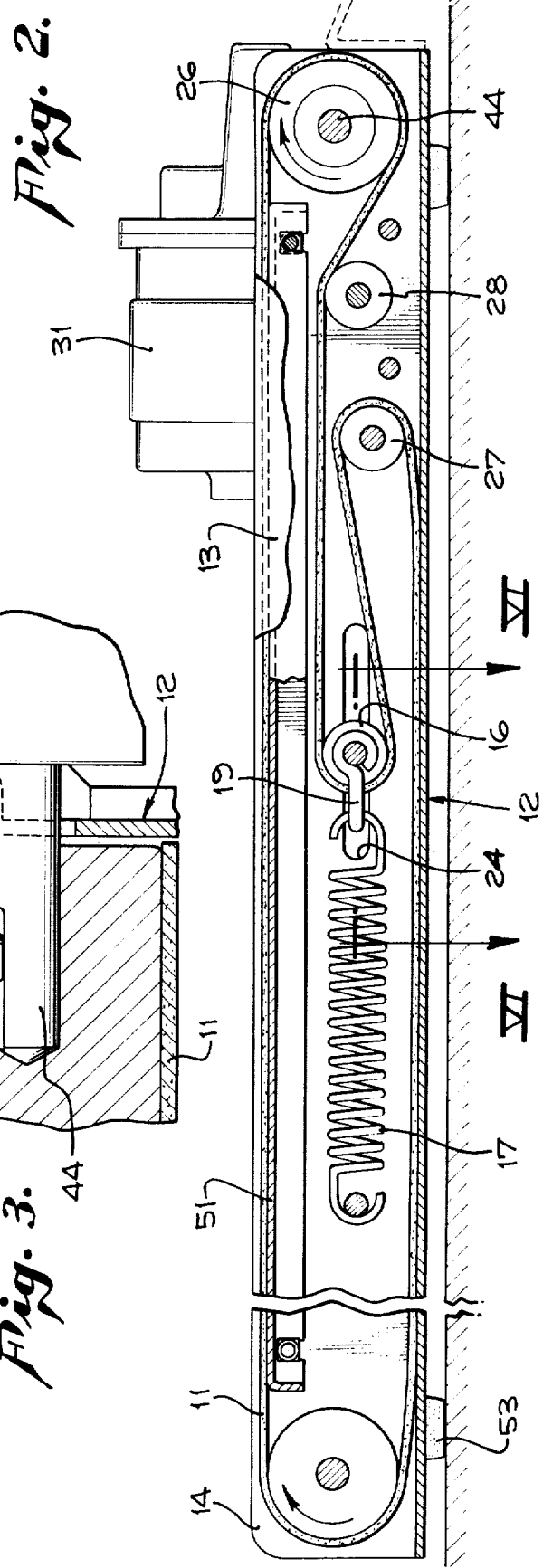
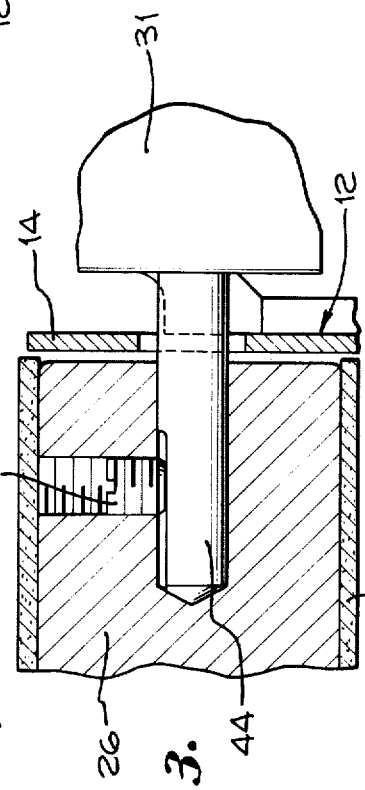
Fig. 1.
Fig. 2.
Fig. 3.

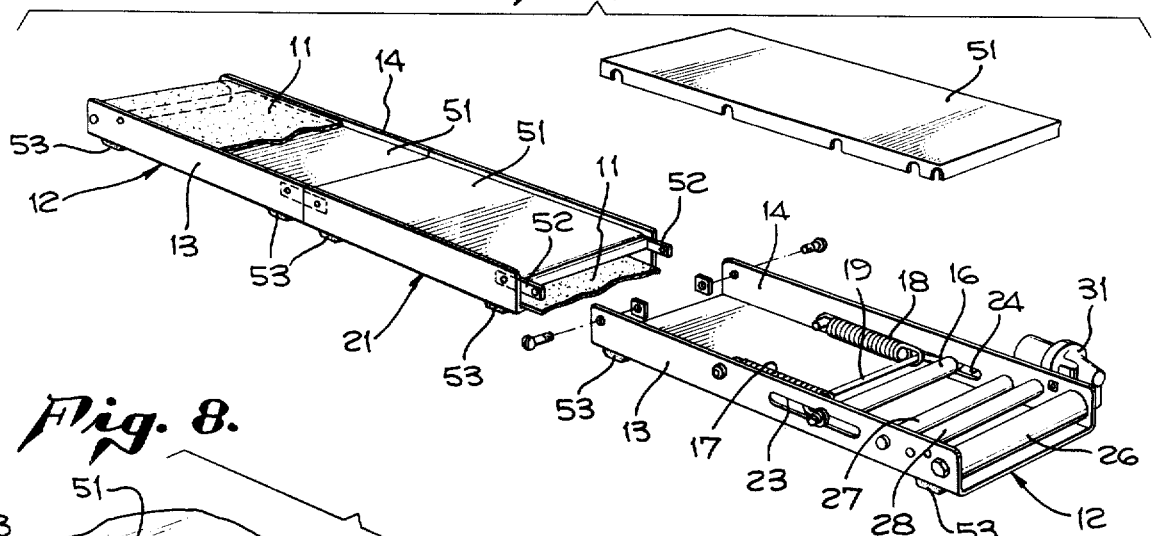
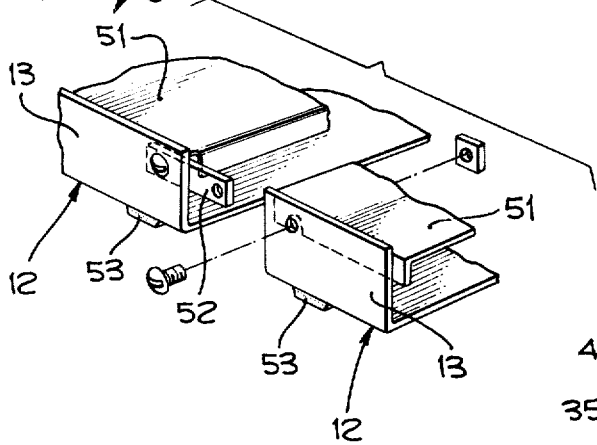
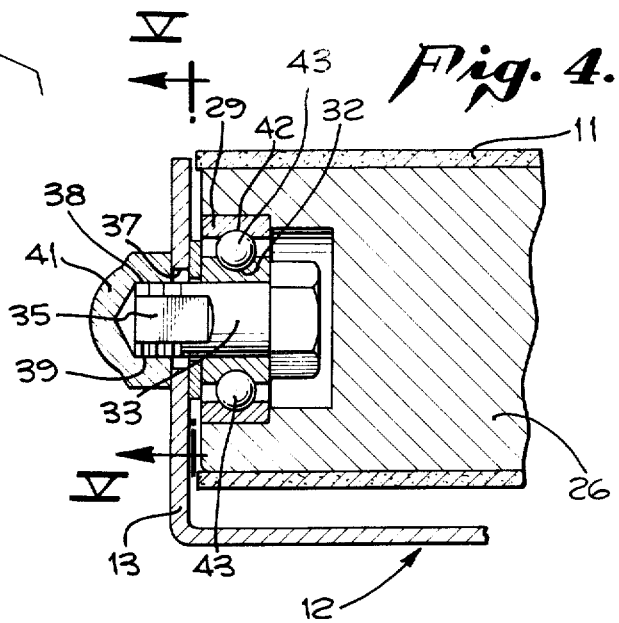
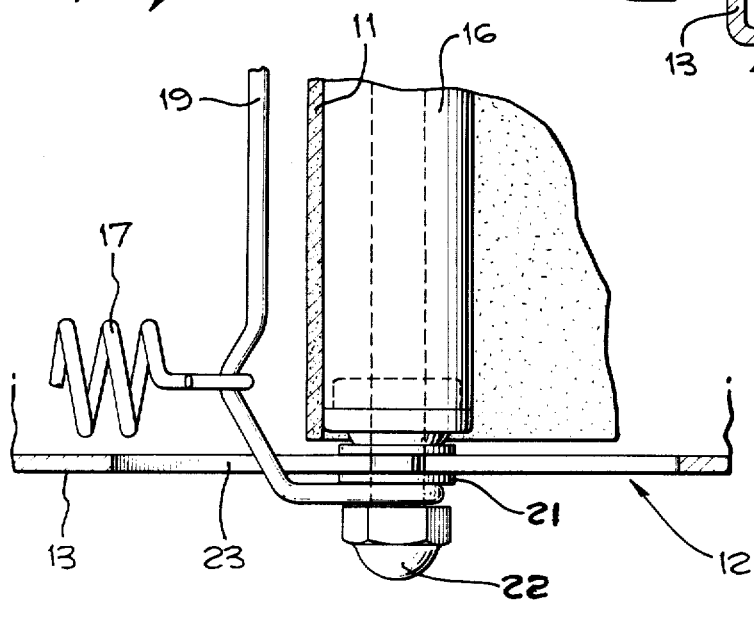
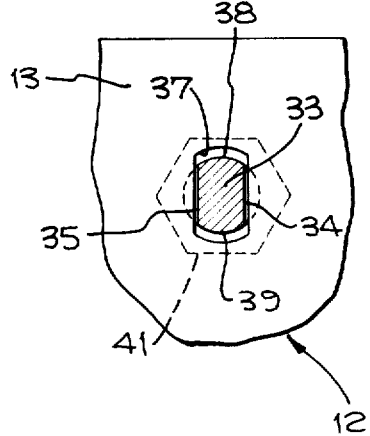

CONVEYOR ASSEMBLY

BACKGROUND OF THE INVENTION

The present invention relates to a conveyor and more particularly to a low profile system for material transfer which avoids the numerous problems inherent in similarly employed prior art devices.

Various prior art conveyor systems have been developed and proposed to take up the slack in a conveyor belt. Often the conveyor belt expands due to stress under normal conditions of usage. Furthermore, the belt may become loose due to change in temperature or humidity in the immediate environment. Various prior art devices have attempted to solve this problem using a spring loaded idler roller. U.S. Pat. No. 2,955,701 to Schwertl is typical of such prior art devices. This patent employs a spring loaded roller at the end of the conveyor belt. Such devices, however, cause a change in the linear distance from one end of the conveyor system to the other in proportion to the movement of the spring. This variation in the effective length of the system renders it impractical to utilize such systems to interface with other stationary equipment at either end of the module.

Various prior art devices have attempted to achieve compactness and low profile. U.S. Pat. No. 2,523,829 to Hubbell is typical of such prior art devices. The Hubbell patent discloses a low profile module. Such devices however fail to disclose the utilization of the vertical sidewalls of the frame for guidance of the conveyor belt in the forward and reverse direction to prevent lateral shifting of the conveyor belt.

Another problem inherent in prior art conveyor modules is the inaccessibility to the apparatus and particularly the idlers within the frame. Often it is necessary to obtain access to the apparatus within the frame for purposes of threading the belt, repairing the apparatus and routine maintenance. It is therefore important to be able to obtain ease of access to the apparatus. U.S. Pat. No. 3,120,303 to Leonard discloses conveyor sections which provide access to the apparatus within the frame. Such devices however require a substantial amount of disassembly. Furthermore, the guide rails of the frames of such devices do not provide sufficient guidance to prevent lateral shifting of the belt.

Various prior art conveyor systems require a number of bearings coupled to the rollers particularly the drive rollers. U.S. Pat. No. 1,943,998 to Adams is typical of such prior art devices. These devices require two or more bearings coupled to the rollers shown therein. It has been found desirable to eliminate one of the roller bearings and couple the drive motor directly to the drive roller.

In order to increase the friction between various rollers in the conveyor belt in typical prior art devices, an assembly including a number of rollers has been employed to cause the belt to contact one of the rollers for a substantial part of its circumference. Such devices however have not been used to their optimum capacity since typically they do not increase the contact by the belt with a substantial portion of the circumference of the drive roller.

SUMMARY OF THE INVENTION

The general purpose of the present invention is to provide a conveyor assembly which embraces all the advantages of similarly employed prior art devices and possesses none of the aforedescribed disadvantages. To attain this, the present invention provides a spring loaded belt tension roller mounted in slots to provide automatic adjustment of the endless belt to maintain optimum tautness. The spring loading reduces the stress of the belt behind the load and in a substantial portion of the belt moving in the reverse direction behind the tension belt to thereby increase the useful life of the belt. The spring loading also retains the belt taut to compensate for any stretching of the belt due to change in temperature or humidity in the immediate vicinity of the belt. The tautness of the belt tension roller is maintained without any variation in the over-all length of the conveyor module.

The conveyor frame has a low profile with the belt guided by vertical members in the form of side rails of the frame in the forward and reverse directions to prevent lateral shifting of the belt.

The drive roller is mounted on a single roller bearing with the inner race secured to a bolt which is fitted through a keyed hole on one side of the frame. The bolt has two arcuate surfaces and a threaded nut engages the arcuate surfaces to secure the bolt and the inner race of the roller bearings while permitting the outer race to rotate on the rollers. The other end of the drive roller is directly coupled to the roller. Thus, only one roller bearing assembly is required.

An idler roller provides contact of the belt with a substantial portion of the circumference of the drive roller. This increases the friction between the drive roller and the conveyor belt to thereby provide better conversion of the energy from the drive motor to the belt.

The frame has a slide surface on the top which may be removed to provide access to the belt tension roller, the drive roller and an idler roller to permit access to them for purposes of adjusting the belt, repairs, and routine maintenance. The frame also has coupling bars to connect adjacent vertical side members. The coupling bars couple adjacent vertical side members to maintain them in a uniform plane in their respective associated side without impeding the path of the belt. The bottom of the frame is mounted on rubber feet rather than screw fasteners used in similarly employed prior art devices. This renders the bottom of the frame smooth to prevent any scratching against the conveyor belt while the belt is travelling in the reverse direction in the conveyor module.

Accordingly, an object of the present invention is to provide means for retaining a conveyor belt taut without varying the over-all length of the conveyor module.

Another object is to provide means to retain a conveyor belt taut while reducing the stress on the belt in the reverse direction.

Still another object is to provide means for imparting rotational energy to a drive roller of a conveyor system using only one roller bearing.

Yet another object is to provide means to increase the frictional contact of the drive roller of a conveyor assembly and the belt.

Still another object is to provide means to prevent lateral shifting of a conveyor belt.

A further object is to provide a conveyor module having a compact low profile.

Yet a further object is to provide means to retain the sidewalls of the frame of a conveyor assembly in a single plane.

Other objects, advantages, and novel features of the present invention will become apparent from the following detailed description of the invention when considered in conjunction with the accompanying drawings.

BRIEF DESCRIPTION OF THE DRAWINGS

FIG. 1 is an end view of the conveyor assembly of the present invention;

FIG. 2 is a side view with portions broken away of the conveyor assembly of the present invention;

FIG. 3 is a vertical sectional view of a portion of the drive roller within the dotted circle III of FIG. 1;

FIG. 4 is a vertical sectional view of a portion of the roller bearing for the drive roller within the dotted circle IV of FIG. 1;

FIG. 5 is a vertical sectional view of the nut and bolt assembly of the roller bearing taken along the plane IV—IV of FIG. 4;

FIG. 6 is a sectional view of FIG. 2 taken along the plane VI—VI.

FIG. 7 is an exploded perspective view of the conveyor module of the present invention; and FIG. 8 is an exploded perspective view of mating adjacent sections of the conveyor module showing the coupling bars.

DESCRIPTION OF THE PREFERRED EMBODIMENT

Referring to FIGS. 1 and 2, there is shown the conveyor assembly of the present invention having an endless belt 11 mounted on a frame 12 having vertical side members 13 and 14 respectively. The side members 13 and 14 guide the forward and return movement of the belt 11. As shown in the embodiments of FIGS. 3 and 4, the side members 13 and 14 may be mounted so that their tops are slightly below the stop surface of belt 11.

A tension roller 16 is spring loaded by springs 17 and 18 shown in FIG. 7. The springs are coupled to a bar 19 which is connected to the tension roller 16 between a washer 21 and a nut 22 at one end as shown in FIG. 6. Although it is not shown, a similar washer and nut combination is provided for at the opposite end of the roller 16. The roller 16 is mounted for movement in the slots 23 and 24 of the frame 12 as shown in FIG. 7 to take up the slack in the belt to thereby maintain it taut. The spring loading of the belt reduces the stress on the belt behind the load and in the reverse direction past an idler 27.

A drive roller 26 is provided for driving the belt 11. The belt is kept extra tight to the drive roller in the forward direction to provide a friction lock. This reduced stress area of the belt increases the useful life of the belt. An idler roller 28 is mounted in close proximity to the drive roller 26 to increase the frictional drive between the drive roller 26 and the belt 11.

One of the features of the present invention is the provision of the tension roller 16 at some intermediary position between the forward and reverse end of the frame 12. This maintains the length of the conveyor assembly constant regardless of the stretching of the belt 11 by the tension due to the springs 17 and 18. Thus, the stretching of the belt due to change in temperature, humidity or normal stress is compensated for by the tension roller 16 and the associated springs which provide spring loading without affecting the over-all length of the module. This permits interfacing of the module with other equipment at the forward and reverse ends of the frame 12.

The drive roller is mounted on the frame with a single roller bearing assembly as shown in FIG. 4 on one side and a drive motor 31 shown coupled to the other side as shown in FIG. 3. The roller bearing 29 has an inner race 32 which is mounted on a bolt 33 having two flat surfaces 34 and 35 as shown in FIG. 5. A keyed hole 37 is formed in one of the vertical sides 13 of the frame 12 to permit the bolt 33 to be fitted therethrough as shown and prevent it from turning. The bolt 33 has two threaded arcuate surfaces 38 and 39. A threaded nut 41 secures the bolt to the vertical side 13 of the frame 12 to maintain the inner race stationary. The outer ring of the roller bearing 29 is press fit into the drive roller 26 to rotate with the drive roller. Thus, the outer race 42 is rotatable on the rollers 43 while the inner race is maintained stationary by the nut 41 and bolt 33 assembly.

The opposite end of the drive roller 26 is coupled by a shaft 44 to the motor 31 and secured thereto by a set screw 46 as shown in FIG. 3. Thus, the direct connection of the drive motor 31 to the drive roller 26 requires only one bearing. The motor may be any suitable motor such as a gear motor. The nut and bolt assembly for securing the roller bearing 29 to the vertical side member 13 prevents the roller bearing from shifting laterally.

The drive roller assembly may be easily mounted by first inserting the bolt 33 in the keyed hole 37 and lowering the end connected to the motor 31. The shaft 44 is then inserted in the drive roller 26 and secured thereto by the set screw 46.

A slide surface 51 shown in FIG. 7 is easily removable to provide ease of access to the tension roller 16, the drive roller 26 and the idler roller 28. Access may also be had to the remaining apparatus beneath the slide roller for ease of maintenance and for threading the belt 11.

Coupling bars 52 shown in greater detail in FIG. 8 couple adjacent vertical side members of the frame to maintain the vertical side members in a uniform plane in their respective associated sides.

The frame is mounted on rubber feet 53 to thereby avoid the use of screw fasteners. The lower surface of the frame 12 thereby is unimpeded to avoid any scratching of any such fasteners against the belt 11 while it is travelling in the reverse direction.

Thus, the present invention provides a conveyor assembly which has a low profile and is therefore relatively compact. The side rails are flush with the belt to prevent lateral shifting of the belt. As shown in the embodiment in FIGS. 3 and 4, the tops of the side rails are slightly below the top surface of the belt to thereby permit the belt to transport objects having a greater width than the belt. The belt tension roller retains the belt taut without any change in the over-all length of the assembly. The idler roller increases the frictional drive between the drive roller and the conveyor belt.

A slide surface on the top of the frame is removable to provide access to the drive roller, the idler roller and the tension belt for ease of maintenance. The coupling bars maintain the sides of the frame in a uniform plane to maintain the sides flush with the belt to thereby prevent any lateral shifting of the belt.

Obviously, many modifications and variations of the present invention are possible in light of the above teaching. It is therefore to be understood that within the scope of the appended claims, the invention may be practiced otherwise than as specifically described.

I claim:

1. A conveyor assembly comprising:
   an endless belt,
   a frame having vertical members on both sides for guiding the forward and return movement of said belt,
   a spring loaded belt tension roller mounted to said frame in slots in opposite vertical members of said frame for maintaining said belt taut with said belt tension roller being spring loaded by two springs each mounted to said frame and each connected to a bar connected to said belt tension roller to maintain the spring loading on said tension roller,
   a drive roller mounted to said frame for driving said endless belt, and
   an idler roller mounted in close proximity to said drive roller to increase the contact of said endless belt with said drive roller to provide a friction lock to thereby increase the frictional drive between said drive roller and said endless belt.

2. The assembly as described in claim 1 and wherein said drive roller is mounted on a single roller bearing on one side and further including a drive motor coupled to said drive roller on the other side.

3. The assembly as described in claim 1 and wherein said drive roller is mounted at one end of said frame and said belt tension roller is mounted at some intermediary position between the ends of said frame to thereby maintain the length of said conveyor assembly constant regardless of the stretching of said endless belt.

4. The assembly as described in claim 3 and wherein said drive roller is mounted on a single roller bearing on one side and further including a drive motor coupled to said drive roller on the other side.

5. The assembly as described in claim 4 and further including a removable slide surface on the top of said frame for ease of access to said tension roller, drive roller, and idler roller.

6. The assembly as described in claim 5 and further including coupling bars for coupling adjacent vertical side members of said frame to maintain said vertical side members on either side in their respective vertical planes.

7. The assembly as described in claim 1 and wherein the top of said vertical members is slightly below the top of the portion of said endless belt moving in the forward direction.

8. A conveyor assembly comprising:
   a frame having a plurality of vertical side members on both sides and a plurality of coupling bars for coupling adjacent vertical side members to maintain them in a uniform plane in their respective associated sides,
   an endless belt mounted on said frame to permit said vertical members to guide the forward and reverse movement of said belt,
   a spring loaded belt tension roller mounted in slots in a pair of vertical members on opposite sides of said frame for maintaining said belt taut, with said belt tension roller being spring loaded by two springs each mounted to said frame and each connected to said belt tension roller to maintain the spring loading on said tension roller, and
   a slide surface removable from the top of said frame to provide ease of access to said tension roller and ease of threading of said endless belt around said tension roller.

9. The assembly as described in claim 8 and further including a drive roller mounted on a single roller bearing on one of said vertical members and a drive motor coupled to said drive roller on the opposite vertical member with said drive roller mounted at one end of said frame and said belt tension roller mounted at some intermediary position between the ends of said frame to thereby maintain the length of said conveyor assembly constant regardless of the stretching of said endless belt.

10. The assembly as described in claim 8 and further including a drive roller mounted to said frame for driving said endless belt and an idler roller mounted in close proximity to said drive roller to provide a friction lock to thereby increase the frictional drive between said drive roller and said endless belt.

11. The assembly as described in claim 8 and wherein the top of said vertical members is slightly below the top of the portion of said endless belt moving in the forward direction.

12. A conveyor assembly comprising:
   a frame having a plurality of vertical side members on both sides and a plurality of coupling bars for coupling adjacent vertical side members to maintain them in a uniform plane in their respective associated sides,
   an endless belt mounted on said frame to permit said vertical members to guide the forward and reverse movement of said belt,
   a spring loaded belt tension roller mounted in slots in a pair of vertical members on opposite sides of said frame for maintaining said belt taut,
   a slide surface removable from the top of said frame to provide ease of access to said tension roller and ease of threading of said endless belt around said tension roller,
   a drive roller mounted on a single roller bearing on one of said vertical members and a drive motor coupled to said drive roller on the opposite vertical member with said drive roller mounted at one end of said frame and said belt tension roller mounted at some intermediary position between the ends of said frame to thereby maintain the length of said conveyor assembly constant regardless of the stretching of said endless belt, and wherein said single roller bearing has an inner race mounted on a bolt having two arcuate surfaces adapted to be threaded through a hole in one of said vertical members and secured thereto by a threaded nut to maintain the inner race stationary while permitting the outer race of said roller bearing to rotate on said roller bearing.

13. The assembly as described in claim 12 and further including an idler roller mounted in close proximity to said drive roller to increase the contact of said endless belt with said drive roller to thereby increase the frictional drive between said drive roller and said endless belt.

* * * * *